United States Patent
Ju et al.

(10) Patent No.: US 7,623,651 B2
(45) Date of Patent: Nov. 24, 2009

(54) CONTEXT RETENTION ACROSS MULTIPLE CALLS IN A TELEPHONE INTERACTION SYSTEM

(75) Inventors: Yun-Cheng Ju, Bellevue, WA (US); David G. Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 10/938,714

(22) Filed: Sep. 10, 2004

(65) Prior Publication Data

US 2006/0056612 A1   Mar. 16, 2006

(51) Int. Cl.
H04M 3/00 (2006.01)
H04M 5/00 (2006.01)
(52) U.S. Cl. .............. 379/265.01; 379/265.02; 379/266.1; 379/309; 379/88.01; 379/88.16; 379/88.19; 434/322
(58) Field of Classification Search ............ 379/265.01, 379/265.02, 266.1, 309, 88.01, 88.16, 88.19; 434/322
See application file for complete search history.

(56) References Cited

U.S. PATENT DOCUMENTS

| | | | | |
|---|---|---|---|---|
| 5,185,782 A * | 2/1993 | Srinivasan | ............. | 379/210.01 |
| 5,740,240 A * | 4/1998 | Jolissaint | ............... | 379/265.02 |
| 5,757,904 A * | 5/1998 | Anderson | ............. | 379/265.06 |
| 6,639,982 B1 * | 10/2003 | Stuart et al. | ............ | 379/266.03 |
| 2006/0129580 A1 * | 6/2006 | Haft et al. | ................... | 707/101 |
| 2006/0204944 A1 * | 9/2006 | Preskill | ..................... | 434/322 |

OTHER PUBLICATIONS

VoiceGenie and VoxSurf Announce Speech-Driven Multi-Channel Communication Solution, press release, Sep. 16, 2002.
Intervoice, Omvia™ Speech Call Flow Components, Product Capabilities Review, Jul. 17, 2003.
XML Journal, VoiceXML 2.0 and Speech Recognition Grammar Published as W3C Recommendations, Mar. 17, 2004, http://www.sys-con.com.
"Fujitsu Call Center System CCRM-1 Product Description" Fujitsu Call Center System CCRM-1—Product Description, Fujitsu, Sep. 2002.
"Voice Dialer 364 Data Book", Interactive Speech, Sensory Voice Activation, Sensory, Inc. P/N 80-0174-4, 2000.
MacLoed, R., "Linking the New Network to the PSTN Call Management Features on the Brooktrout TR 1000", Brooktrout Technolgoy, Jun. 2000.
Nortel Networks Corporate Directory Dialer brochure, www.nortelnetworks.com, Copyright 2003.
Gold Systems, Inc., V-Dialer, Your Automated Receptionist, Brochure, published at least as early at Jul. 24, 2004.
U.S. Appl. No. 10/881,685, filed Jun. 30, 2004, Yun-Cheng Ju et al.

* cited by examiner

Primary Examiner—Quynh H Nguyen
(74) Attorney, Agent, or Firm—Westman, Champlin, & Kelly, P.A.

(57) ABSTRACT

A method of providing information to a user in a telephone interactive system includes receiving a new call. A comparison is then made between an identifier associated with the new call with stored call information pertaining to previous calls. If the identifier associated with the new call matches an identifier associated with a previous call, a subsequent action taken in the new call is based on context information stored from the previous call.

24 Claims, 6 Drawing Sheets

| Caller ID | Time Stamp | Progress Indicator |
|---|---|---|
| 4257067957 | 2/9/2004 12:57:36PM | Calling David Ollason at work |
| 4257074347 | 2/9/2004 12:59:36PM | Connected to the 1st Michael Anderson |
| 4257074501 | 2/9/2004 12:59:59PM | Recorded E-mail to yuncj (not sent yet) |

310 — Caller ID column
315 — (brace over Time Stamp and Progress Indicator)
320 — Time Stamp
325 — rows

| Caller ID | Time Stamp | Progress Indicator | Task |
|---|---|---|---|
| 4257067957 | 7/9/2004 12:57:36PM | Turn on to I-5 | SEA/TAC to Space Needle |
| 4257074347 | 7/9/2004 15:59:36PM | Computing directions | SEA/TAC to Downtown, Seattle |
| 4257074501 | 7/9/2004 17:59:59PM | Directions completed | 147 2$^{nd}$ Ave., Seattle to 35 4$^{th}$ Str., Redmond |

CONTEXT RETENTION ACROSS MULTIPLE CALLS IN A TELEPHONE INTERACTION SYSTEM

BACKGROUND OF THE INVENTION

The present invention generally pertains to interactive computer systems with access provided through a telephone. More specifically, the present invention pertains to improving the user experience if the user places multiple calls to the system.

Obtaining information or performing a task using a telephone or similar device as an input mechanism for a computer system is prevalent. For instance, it is quite common for a company to have an automated receptionist that answers incoming calls, queries the caller as to which department or individual he/she would like to speak with, and then transfers the call accordingly. Similarly, many applications exist that allow a caller to obtain information from a computer system. For example, given a first location and a second location the caller intends to drive to, driving directions can be obtained.

Although call routing applications (also known as dialers, voice dialers, or name dialers) and other applications are now common, frustrations still exist in their use. For instance, if the caller wishes to speak with an individual in a company, but the company has more than one individual by that name, in many instances the caller may simply choose one of the individuals only to find out that the individual chosen was incorrect. Since many call routing or dialer applications lose control of the call upon transfer, the caller must hang up and recall the general number and answer any necessary queries by the automated system in order to select the other individual to be transferred to. At best, the caller will find the process a minor annoyance and at worst particularly frustrating. However, it remains without question that hanging up and redialing is time consuming for the caller.

Frustration can also arise if the telephone call connection is inadvertently lost. Cellular phones are being used with ever increasing frequency by individuals as they conduct their activities on the go. However, it is also quite common to lose the connection inadvertently due to lack of coverage from "bad" cells or the typology that the caller is calling from. If the caller is in the process of interacting with a call routing application or any other application such as an application that provides driving instructions, upon loss of the connection, the caller must redial and respond to any queries by the system to return where he/she has left off.

The present invention provides solutions to one or more of the above-described problems and/or provides other advantages over the prior art.

SUMMARY OF THE INVENTION

A method of providing information to a user in a telephone interactive system includes receiving a new call. A comparison is then made between an identifier associated with the new call with stored call information pertaining to previous calls. If the identifier associated with the new call matches an identifier associated with a previous call, a subsequent action taken in the new call is based on context information stored from the previous call.

Some further aspects of include recording progress indicators as the new call processes the call and takes subsequent actions. The progress indicators can include a timestamp. In addition, other information pertaining to the overall request can be stored in the context information. This additional information is different than the progress indicators and can help place the caller in a position similar to that of the previous call. The method described above with or without the further aspects easily saves time for the caller because the caller need not repeat information previously entered from a previous call.

Other features and benefits that characterize embodiments of the present invention will be apparent upon reading the following detailed description and review of the associated drawings.

BRIEF DESCRIPTION OF THE DRAWINGS

FIG. 2-1 is a schematic block diagram representation of a dialing system.

FIG. 2-2 is a schematic block diagram representation of components of the dialing system shown in FIG. 2-1.

DETAILED DESCRIPTION OF ILLUSTRATIVE EMBODIMENTS

Various aspects of the present invention pertain to retaining context of a previous call made by a user to a telephone interactive computer system in order that upon a subsequent call, the user can be provided with relevant information quickly and without having to reenter or respond to previously answered questions. Examples of well-known computing systems, environments, and/or configurations that may be suitable for use with the invention include, but are not limited to, personal computers, server computers, hand-held or laptop devices, multiprocessor systems, microprocessor-based systems, set top boxes, and programmable dialing applications. Embodiments of the present invention can be implemented in association with a call routing system, wherein a caller identifies with whom they would like to communicate and the call is routed accordingly. Embodiments can also be implemented in association with any number of applications that a user interacts with over a telephone such as applications that render travel directions, e-mails, movie locations to name just a few. It should also be noted that although described below in the context of a call routing system and a general telephone interactive system these are simply examples of systems within which embodiments of the present invention can be implemented and should not be considered limiting.

Prior to discussing embodiments of the present invention in detail, an exemplary computing environment within which the embodiments and their associated systems can be implemented will be discussed.

Figure 1:
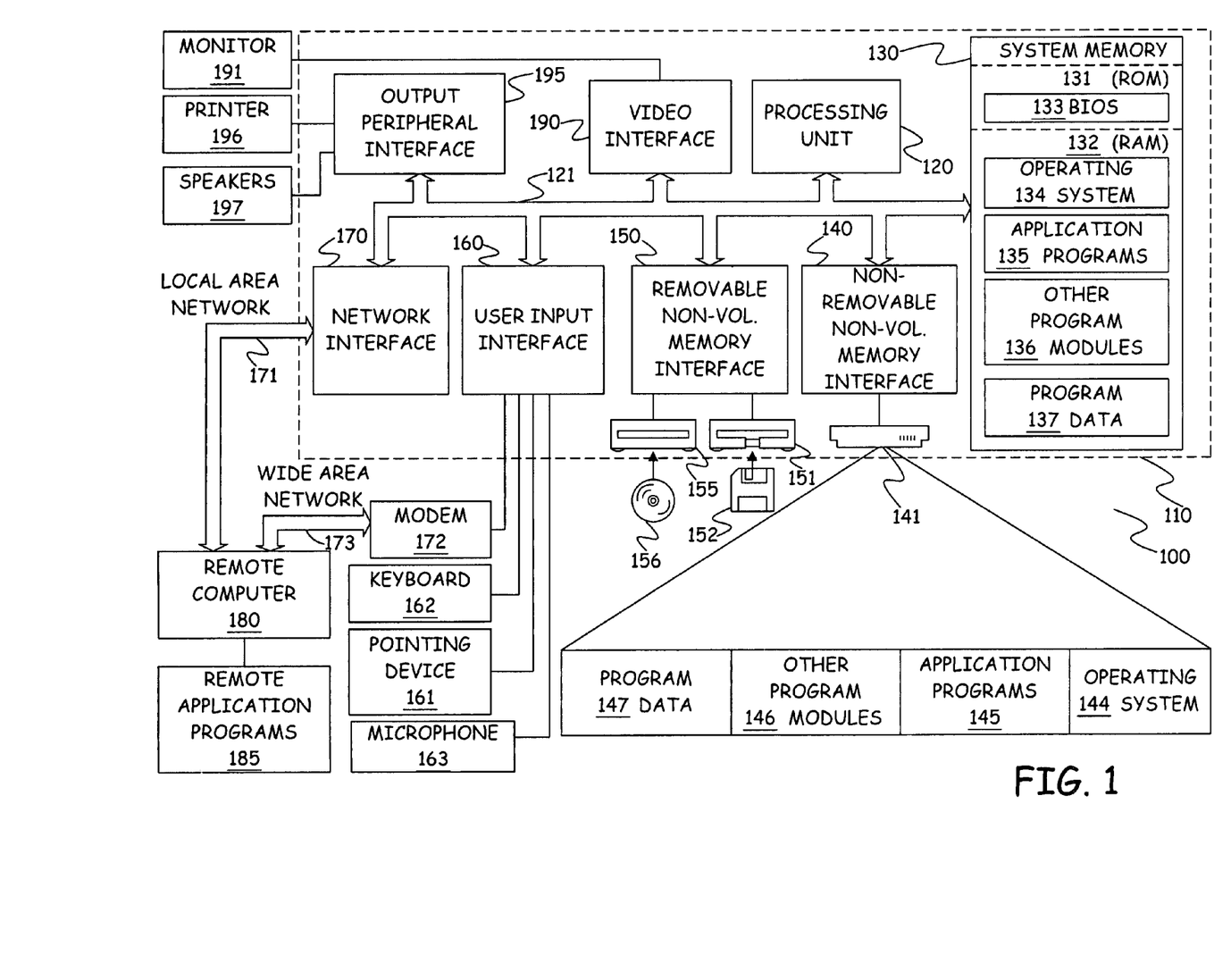
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Tasks performed by the programs and modules are described below and with the aid of figures. Those skilled in the art can implement the description and figures as processor executable instructions, which can be written on any form of a computer readable media.

The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which also represents a telephone), and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 21:
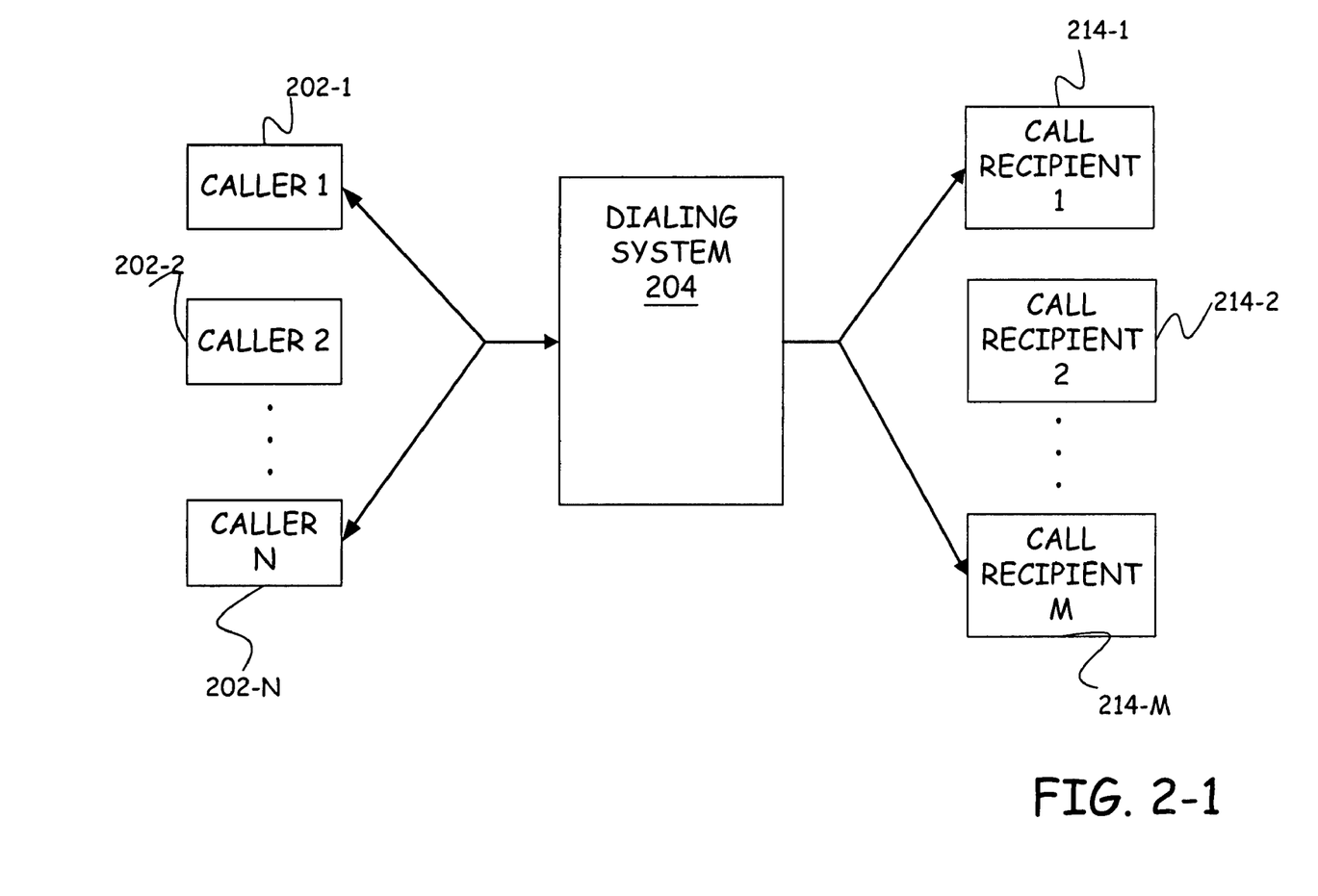
Figure 22:
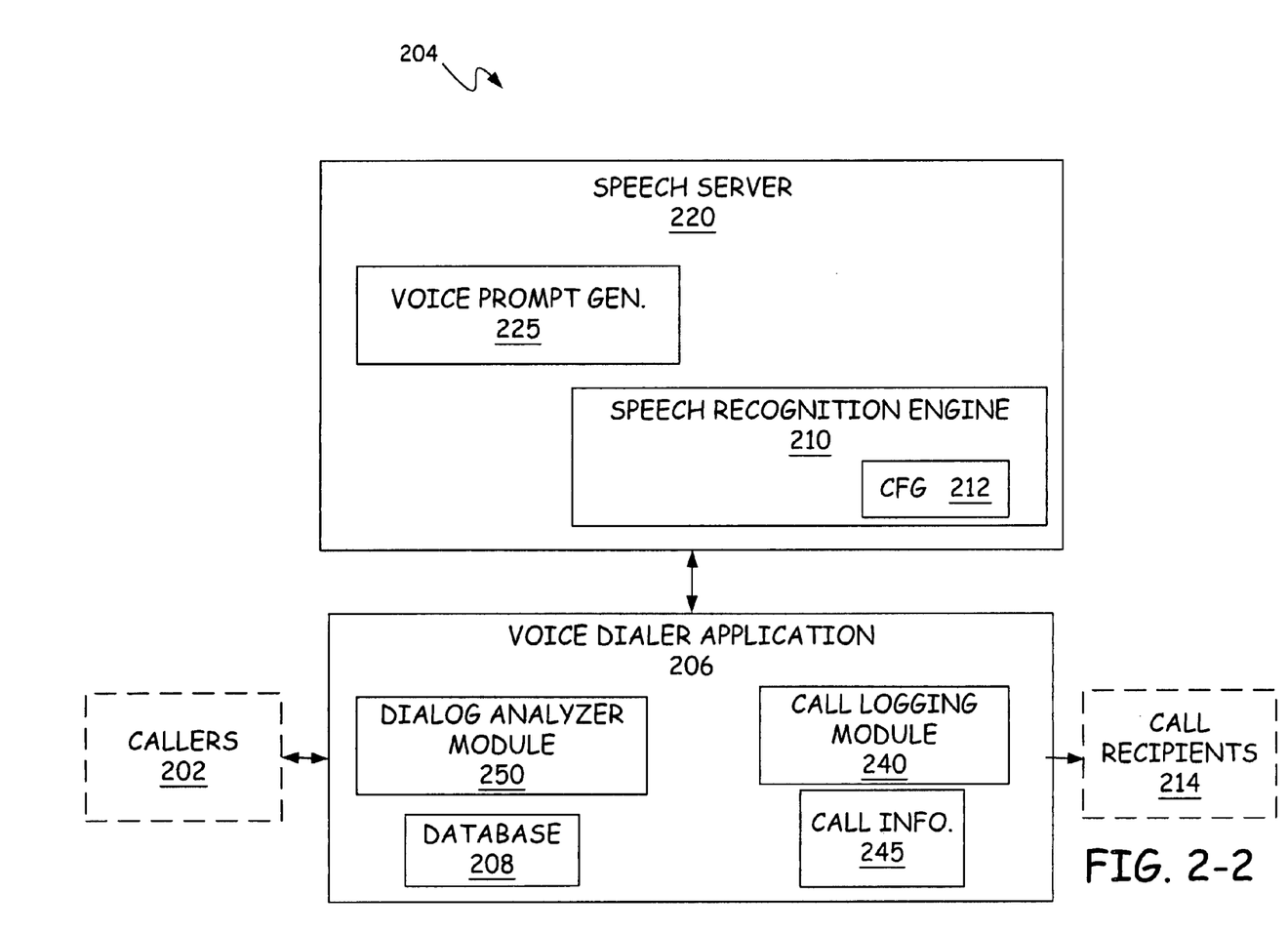

FIGS. 2-1 and 2-2, in accordance with aspects of the present invention, are schematic block diagrams of a dialing system 204. System 204 is illustratively implemented within one of the computing environments discussed in association with FIG. 1, or within other computing environments. As shown in FIG. 2-1, dialing system 204 is accessible by callers 202 (callers 202-1 through 202-N are illustrated) who wish to be connected to, or leave a message for, potential call recipients 214 (call recipients 214-1 through 214-M are illustrated). There can of course be overlap between the callers and the recipients.

FIG. 2-2 illustrates in greater detail components or modules of dialing system 204 in accordance with one exemplary embodiment. In FIG. 2-2, callers 202 and potential call recipients 214 are shown in dashed lines to illustrate that, while these persons utilize the dialing system 204, they are not themselves part of the dialing system 204.

Hereinafter, system 204 will be described with respect to a voice-dialer system adapted to transfer calls based on speech requests. Nevertheless, it should be understood that in other embodiments system 204 can be configured to respond to non-verbal user instructions such as but not limited to responding to DTMF signals transmitted by the user through operation of the telephone keypad. Such systems include DTMF recognition modules for receiving user DTMF responses and are well-known in the art. The manner in which the user provides responses is not critical.

In the embodiment of FIG. 2-2 voice-dialer application 206 has access to a speech server 220. Voice dialer application or component 206 includes or can access a database 208 of names of potential call recipients 214, a call logging module 240, and a dialog analyzer module 250. In one illustrative embodiment, speech server 220 hosts or contains a speech recognition engine 210 having a grammar 212 (herein exemplified as a CFG). Speech server 220 also stores a voice prompt generator module 225 that can provide synthesized speech from text and/or stored recordings of a human speaker.

It should be noted that application 206, database 208, voice prompt generator module 225, speech recognition engine 210, grammar 212, call logging module 240, dialog analyzer module 250, and other modules discussed below need not necessarily be implemented within the same computing environment. For example, application 206 and its associated database 208 could be operated from a first computing device that is in communication via a network with a different computing device operating recognition engine 210 and its associated grammar 212. These and other distributed implementations are within the scope of the present invention. Furthermore, the modules described herein and the functions they perform can be combined or separated in other configurations as appreciated by those skilled in the art.

Figure 3:
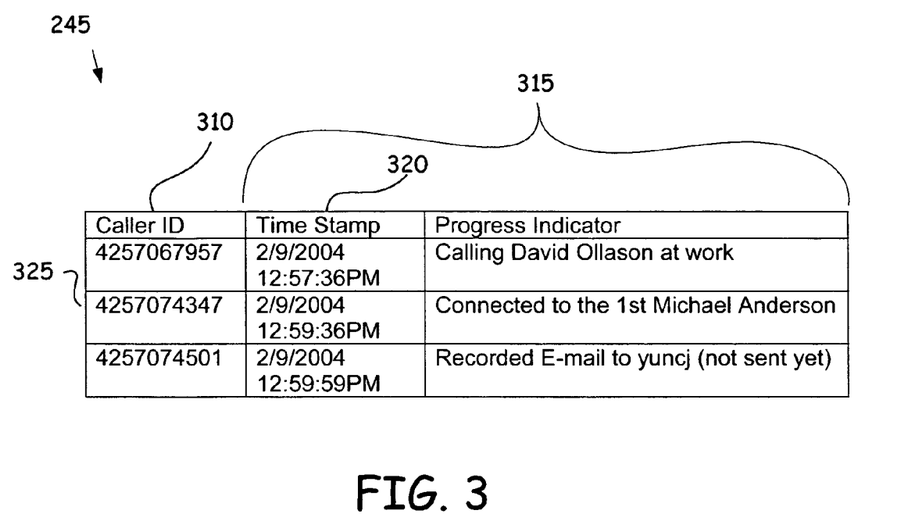
FIG. 3 is a pictorial representation of stored call information.

As indicated above, call logging module 240 records call information 245 pertaining to each call made to system 206. FIG. 3 is a pictorial illustration of call information 245 retained by caller module 240. Generally, the call information 245 can include an identifier 310 associated with the caller. Typically, identifier 310 is the "caller identifier" or "caller ID" available from the telephone service company that identifies the phone number of the caller. However, it should be understood in other embodiments, identifier 310 can be derived by other means including voice identification, an identifier manually provided by the user through voice or keypad interaction, or the like.

Context information 315 is associated with each corresponding identifier 310. In general, context information includes information related to performing the task desired by the user such as milestone events or progress indicators that indicate to what extent the caller has progressed through the desired task.

A timestamp 320 can be further associated with each call. Although the timestamp can indicate any point in relation to the call, in one embodiment, the timestamp 320 pertains to the associated progress indicator.

In general, call information 245 can be stored for any length of time period. In some embodiments, call information 245 is periodically purged of old information.

Dialog analyzer module 250 uses information retained in call information 245 to ascertain if a call received by application 206 has any relation to previous calls by comparison of the identifier of the current call with the identifiers indicated in call information 245. If, for example, there is a match, and, if desired, upon further comparison the previous call occurred within a selected time period of the current call, dialog analyzer module 250 will inquire upon the caller if he/she would like to continue with the current call based upon the context of the previous call. If the caller confirms this desire, dialog analyzer module 250 can provide relevant stored context information to the dialog application system 206 to continue in relation to the stored information. For example, suppose in a previous call the caller was transferred to one of two Michael Andersons in a company as indicated by entry 325 in call information 245. If the current caller has the same caller ID within a prescribed time from entry 325, dialog analyzer module 250 can confirm with the caller via voice prompt generator module 225 that he is still trying to reach Michael Anderson. If the caller confirms this desire, dialog analyzer module 250 can provide the context information indicating that the caller is trying to reach Michael Anderson and in the previous call he/she was connected to the first Michael Anderson to dialer application 206, whereupon dialer application 206 could inquire whether the caller would like to be transferred to the second Michael Anderson.

Figure 4:
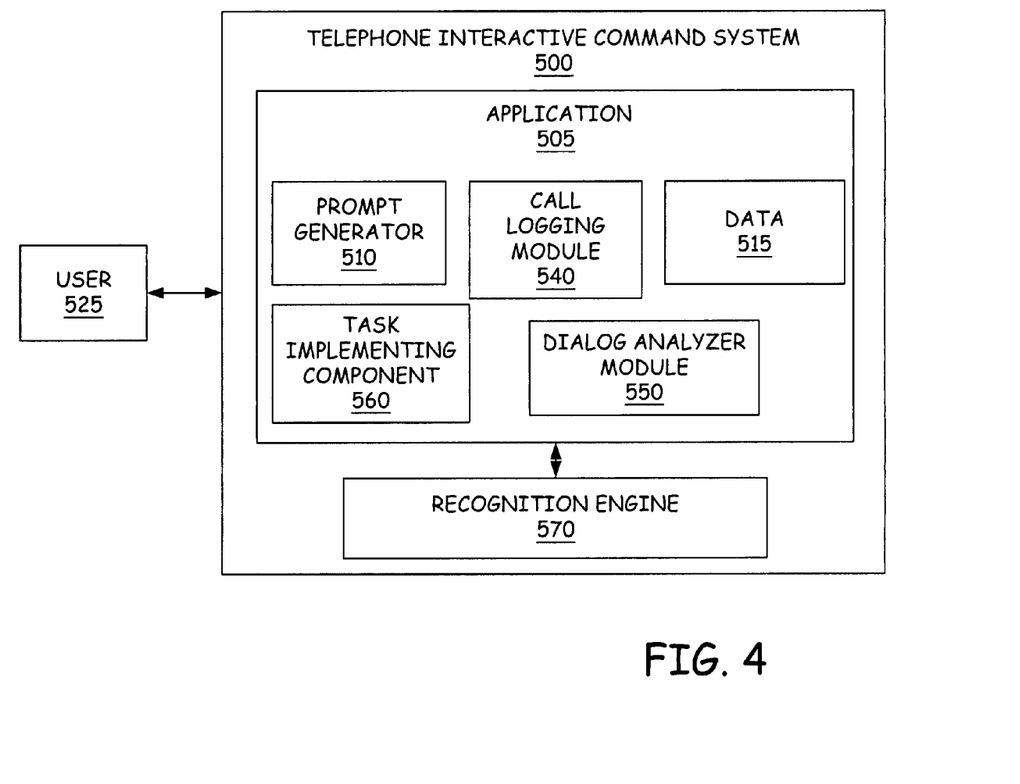
FIG. 4 is a schematic block diagram representation of a telephone interactive command system.

FIG. 4 is a schematic block diagram of a general telephone interactive command system 500 in accordance with an example embodiment of the present invention. System 500 is accessible by a user 525 to implement a task. System 500 includes an application 505 having access to data stored in a store 515. For example, the data stored in store 515 can include email messages of caller 525, data indicative of obtaining travel directions, data indicative of movie locations, or data indicative of the list of employees in a call routing application similar to that described above. It is intended that the embodiment of FIG. 5 be representative of any general application and the foregoing examples should not be considered limiting.

As in the foregoing example, application 505 includes a call logging module 540, a dialog analyzer module 550 that operated in a manner similar to that described above. A task implementing component or module 560 is provided to take action such as render information, route calls, etc. in accordance with the application 505. A voice prompt generator module 510 and a recognition engine 570 (e.g. voice, dtmf, etc.) can be optionally included in a manner to that described above, if desired. It should be understood that some of the tasks such as prompting the caller, receiving responses and performing some tasks for completion of a desired operation can be done by a human operator wherein only maybe some of the tasks of call logging module 540 and/or dialog analyzer module 550 are implemented automatically.

Figure 5:
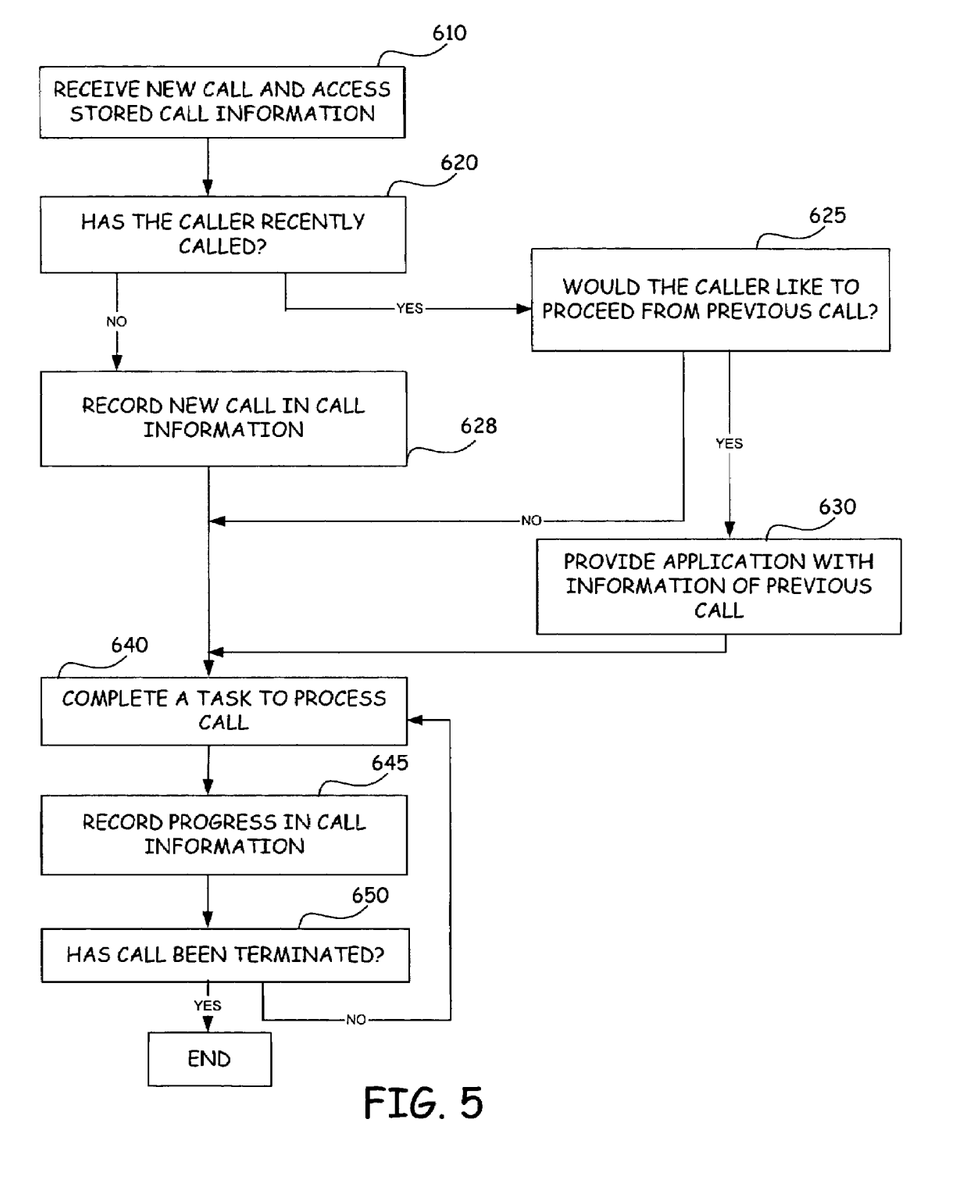
FIG. 5 is a method for processing a call.

FIG. 5 illustrates generally tasks performed by the call logging modules 240, 540 and dialog analyzer modules 250, 550. At step 610, when a new call is received, dialog analyzer module 250, 550 accesses the call information 245. If the caller is not recorded in call information 245 (or not called within a selected time period) at step 620, call information is stored at step 628 and the application begins, where tasks are completed and the call information is updated at steps 640 and 645, respectively, until the call has been terminated at step 650.

However, if at step 620 a previous record exists for the caller and, optionally, the previous call has been within a selected time period of the current call (i.e., the caller has recently called), dialog analyzer module 250, 550 initiates an inquiry, at step 625, with the caller to see if he/she wants to resume the context of the previous call. For example, the current call can resume in proximity to the progress indicator stored in call information 245 (such as shortly before the progress indicator point recorded, at the point indicated by the progress indicator, or at the next step indicated after the progress indicator). If the caller indicates that this is not desired, the application begins as a new call, where tasks are completed and call information for the caller are performed at steps 640 and 645.

If, however, the caller would like to continue in some relation to the previous call, program flow continues with step 630. At step 630, the application is provided with any information in call information 245 necessary to resume the task initiated in the earlier call. In one embodiment, this can include simply providing the information of the progress indicator describing where the previous call left off. For example, assume that entry 325 represents the previous call of the caller. Based on the information stored from the previous call, the application 206 will know that the caller is trying to reach Michael Anderson and that the first Michael Anderson has been previously tried. In this manner, the application can try to connect the caller to the next Michael Anderson in the company. If desired, information from previous calls can also be included in the context information of the current call for the same caller. In the alternative, those entries having an identifier corresponding to the current call can be collected and analyzed to ascertain what the caller has done in previous calls. As appreciated by those skilled in the art, the form of the context information can vary as needed depending on the application.

At steps 640 and 645, whether based on a call from a new caller or a previous caller, various milestones or progress indicators indicative of selected points in processing the call are recorded in call information 245 so as to record the current state of progress in processing the call. Typically, this involves updating the entry with a new timestamp and the current progress indicator, although if desired separate entries can also be made for the same call. In either case, if the caller hangs up or the call gets inadvertently disconnected, call information 245 retains the last current significant event. Steps 640 and 645 are continually repeated until the call is terminated (i.e., the task is completed, the caller hangs up or the call is inadvertently disconnected) as indicated at step 650.

Figure 6:
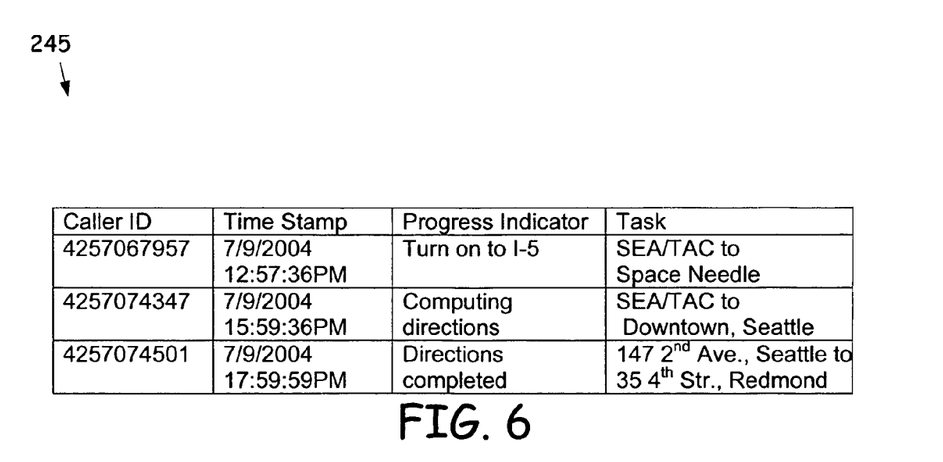
FIG. 6 is a pictorial representation of stored call information.

In the context of another application, assume that a caller 525 has called system 500 and accessed an application 505 that provides map directions. In the first call, assume that the caller has indicated that he/she would like to obtain travel directions from the Seattle/Tacoma Airport to the Space Needle. An entry in call information 245 would thus indicate information illustrated in FIG. 6 of caller's overall desire for map directions between the Seattle/Tacoma Airport and the Space Needle. During the course of providing the directions, also assume that the application updated the record in call information 245 that the directions so far rendered to the caller included turning on to interstate 5, at a time indicated in FIG. 6.

Now, assume that the call was inadvertently disconnected. Upon recalling the system 500, the caller 525 is recognized as having called before at step 620. Dialog analyzer module 550 uses the call information 245 represented by FIG. 6 to ascertain in the previous call that the caller wanted directions from the Seattle/Tacoma Airport to the Space Needle, and therefore prompts the caller if this is still the information desired at step 625. If the caller confirms this request, driving instructions can be provided from a point in relation to that previously recorded from the earlier call. In this manner, the caller need not enter in information that would be redundant from the previous call. This saves time in completing the caller's request. Of course, if desired, the caller can navigate to other information pertaining to the previous call, such as repeating earlier directions. Such navigational or optional tasks will vary from application to application. However, it is important with respect to the present invention that the caller has been efficiently put in this position due to recording and processing of the context information recorded in the previous call.

Although the present invention has been described with reference to particular embodiments, workers skilled in the art will recognize that changes may be made in form and detail without departing from the spirit and scope of the invention.

What is claimed is:

1. A method of providing information to a user in a telephone interactive system that includes an application that is stored on a memory storage device and executed by a processor of a computer, the method comprising:

receiving a new call;

comparing an identifier associated with the new call with call information stored in a database using the processor of the computer, the call information comprising a plurality of entries pertaining to previous calls, wherein each entry of the plurality of entries comprises context information for an associated previous call and includes an indication of a caller ID for the associated previous call, request information for an overall request pertaining to the associated previous call, a progress indicator that indicates a progress point for the overall request reached during the associated previous call, and a timestamp associated with the progress indicator; wherein the overall request is related to a desired task related to the associated previous call and the progress indicator indicates progression through the desired task;

if the identifier associated with the new call identifies an entry in the plurality of entries for a previous call, prompting the caller to inquire whether the new call is in relation to context information stored from the previous call and proceeding with the new call based on the context information stored in the identified entry for the previous call and updating the call information based on context information associated with the new call;

if the identifier associated with the new call does not identify an entry in the plurality of entries for a previous call, adding a new entry to the plurality of entities and recording context information associated with the new call in the new entry.

2. The method of claim 1 and further comprising recording context information pertaining to the new call.

3. A method of providing information to a user in a telephone interactive system that includes an application that is stored on a memory storage device and executed by a processor of a computer, the method comprising:

receiving a new call;

comparing an identifier associated with the new call with stored call information pertaining to previous calls using the processor of the computer;

if the identifier associated with the new call matches an identifier associated with a previous call, prompting the caller to inquire whether the new call is in relation to context information stored from the previous call and proceeding with the new call based on context information stored from the previous call;

if the identifier associated with the new call does not match an identifier associated with a previous call, recording the identifier of the new call in the call information;

recording context information pertaining to the new call; and wherein recording context information includes recording a progress indicator that indicates a progress point for an overall request related to the new call, the overall request being related to a desired task related to the new call and the progress indicator indicating progression through the desired task; and wherein recording context information includes recording a timestamp associated with the progress indicator, and wherein recording context information includes repeatedly recording progress indicators and associated timestamps pertaining to reaching selected points pertaining to various actions related to the new call.

4. The method of claim 3 wherein recording context information includes recording other information pertaining to the new call apart from the progress indicators.

5. The method of claim 4 wherein recording context information includes recording information pertaining to an overall request.

6. The method of claim 5 and further comprising if the identifier associated with the new call matches an identifier associated with a previous call, prompting the caller based on context information stored from the previous call.

7. The method of claim 3 wherein the identifier comprises a caller identifier provided by a phone system.

8. The method of claim 3 wherein the identifier is based on information other than the caller identifier provided by the phone system.

9. The method of claim 3 wherein proceeding with the new call based on context information stored from the previous call comprises transferring the new call in a dialing application.

10. The method of claim 3 wherein proceeding with the new call based on context information stored from the previous call comprises rendering information to the caller.

11. A tangible computer-readable storage medium having instructions for processing calls in a telephone interactive system, wherein the instructions, when executed on the computer, cause the computer to perform a method comprising:

receiving a new call;

comparing an identifier associated with the new call with stored call information pertaining to previous calls using a processor of the computer, wherein the stored call information includes request information for overall requests pertaining to the previous calls and timestamps associated with progress indicators indicating progress points for the overall requests reached during the previous calls, wherein the overall requests are related to desired tasks related to the previous calls and the progress indicators indicate progression through the desired tasks;

if the identifier associated with the new call matches an identifier associated with a previous call and a timestamp associated with the previous call indicates that the new call occurred within a predefined time period after the previous call, prompting the caller to inquire whether the new call is in relation to context information stored from the previous call;

if the caller confirms that the new call is in relation to context information stored from the previous call, taking an action based on the context information stored from the previous call; and storing context information related to the new call;

wherein storing context information includes recording a progress indicator pertaining to reaching a selected point pertaining to a request related to the new call.

12. The computer-readable medium of claim 11 wherein storing context information includes recording a timestamp associated with the progress indicator.

13. The computer-readable medium of claim 12 wherein storing context information includes repeatedly recording progress indicators and associated timestamps pertaining to reaching selected points pertaining to various actions related to the new call.

14. The computer-readable medium of claim 12 wherein recording context information includes recording other information pertaining to the new call apart from the progress indicators.

15. The computer-readable medium of claim 12 wherein recording context information includes recording information pertaining to an overall request.

16. The computer-readable medium of claim 11 wherein the identifier comprises a caller identifier provided by a phone system.

17. The computer-readable medium of claim 11 wherein the identifier is based on information other than the caller identifier provided by the phone system.

18. The computer-readable medium of claim 11 wherein proceeding with the new call based on context information stored from the previous call comprises transferring the new call in a dialing application.

19. The computer-readable medium of claim 11 wherein proceeding with the new call based on context information stored from the previous call comprises rendering information to the caller.

20. A computer-implemented method of processing a call in a dialer application that is stored on a memory storage device and executed by a processor, the computer-implemented method comprising:
  receiving a new call;
  comparing an identifier associated with the new call with stored call information pertaining to call routing actions of previous calls using the processor;
  if the identifier associated with the new call matches an identifier associated with a previous call, prompting the caller to inquire whether the new call is in relation to context information stored from the previous call;
  if the caller confirms that the new call is in relation to context information stored from the previous call, taking an action based on the context information stored from the previous call;
  recording the identifier and the context information pertaining to the new call;
  wherein recording context information includes recording a progress indicator that indicates a progress point for an overall request related to the new call and a timestamp associated with the context information, the overall request being related to a desired task related to the new call and the progress indicator indicating progression through the desired task; and
  wherein recording context information includes repeatedly recording progress indicators and associated timestamps pertaining to reaching selected points pertaining to various actions related to the new call.

21. The computer-implemented method of claim 20 wherein the identifier comprises a caller identifier provided by a phone system.

22. The computer-implemented method of claim 20 wherein the identifier is based on information other than the caller identifier provided by the phone system.

23. The method of claim 1, wherein updating the call information comprises modifying the identified entry to reflect the context information associated with the new call.

24. The method of claim 1, wherein updating the call information comprises generating a new entry.

* * * * *

UNITED STATES PATENT AND TRADEMARK OFFICE
CERTIFICATE OF CORRECTION

PATENT NO. : 7,623,651 B2  Page 1 of 1
APPLICATION NO. : 10/938714
DATED : November 24, 2009
INVENTOR(S) : Yun-Cheng Ju et al.

It is certified that error appears in the above-identified patent and that said Letters Patent is hereby corrected as shown below:

In column 9, line 13, in Claim 1, delete "entities" and insert -- entries --, therefor.

Signed and Sealed this
Eighth Day of February, 2011

David J. Kappos
*Director of the United States Patent and Trademark Office*